US011675970B2

(12) United States Patent
Comeau et al.

(10) Patent No.: US 11,675,970 B2
(45) Date of Patent: Jun. 13, 2023

(54) MACHINE LEARNING SYSTEMS AND METHODS FOR AUTOMATICALLY TAGGING DOCUMENTS TO ENABLE ACCESSIBILITY TO IMPAIRED INDIVIDUALS

(71) Applicant: Open Text Corporation, Waterloo (CA)

(72) Inventors: David Comeau, Ontario (CA); Jeffrey Williams, Markham (CA); Evgeny Kolesnikov, Stouffville (CA); Michael Itkin, North York (CA); June Qiang, Markham (CA); James Relunia, Concord (CA); Brian Sue, Stouffville (CA)

(73) Assignee: OPEN TEXT CORPORATION, Waterloo (CA)

( * ) Notice: Subject to any disclaimer, the term of this patent is extended or adjusted under 35 U.S.C. 154(b) by 84 days.

(21) Appl. No.: 17/174,686

(22) Filed: Feb. 12, 2021

(65) Prior Publication Data
US 2021/0271805 A1    Sep. 2, 2021

Related U.S. Application Data

(60) Provisional application No. 62/976,808, filed on Feb. 14, 2020.

(51) Int. Cl.
| | |
|---|---|
| *G06F 40/16* | (2020.01) |
| *G06F 40/154* | (2020.01) |
| *G06N 20/00* | (2019.01) |
| *G06V 30/413* | (2022.01) |

(52) U.S. Cl.
CPC .......... *G06F 40/16* (2020.01); *G06F 40/154* (2020.01); *G06N 20/00* (2019.01); *G06V 30/413* (2022.01)

(58) Field of Classification Search
CPC ....... G06F 40/16; G06F 40/154; G06N 20/00; G06V 30/413; G06V 30/414
(Continued)

(56) References Cited

U.S. PATENT DOCUMENTS

| | | | | |
|---|---|---|---|---|
| 5,588,072 A | * | 12/1996 | Wang | G06V 10/242 |
| | | | | 382/176 |
| 5,848,184 A | * | 12/1998 | Taylor | G06V 30/414 |
| | | | | 715/204 |

(Continued)

OTHER PUBLICATIONS

D. Le, G. R. Thoma and J. Zou, "Combining DOM tree and geometric layout analysis for online medical journal article segmentation," Proceedings of the 6th ACM/IEEE-CS Joint Conference on Digital Libraries (JCDL '06), 2006, pp. 119-128, doi: 10.1145/1141753.1141777. (Year: 2006).*

*Primary Examiner* — Stephen S Hong
*Assistant Examiner* — Broderick C Anderson
(74) *Attorney, Agent, or Firm* — Sprinkle IP Law Group

(57) ABSTRACT

Systems, methods, and products for auto tagging structured PDF documents that do not have accessibility tags. In one embodiment, structured PDF documents having accessibility tags are first parsed and analyzed to organize the visual components of the documents. The relationships of the identified objects to DOM elements (e.g., tags) are determined, and the objects and related DOM elements are stored in training files. The training files are used to train various classifiers. Untagged PDF documents are then parsed to identify included visual objects, and the classifiers are used to determine DOM elements that should be associated with visual objects identified in the untagged PDF documents. This information is used to construct a DOM structure corresponding to each untagged document. A new PDF is (Continued)

then generated corresponding to each untagged document using the generated DOM structure and visual object information.

20 Claims, 13 Drawing Sheets

(58) Field of Classification Search
USPC ........................................................ 715/236
See application file for complete search history.

(56) References Cited

U.S. PATENT DOCUMENTS

| | | | |
|---|---|---|---|
| 9,959,259 B2* | 5/2018 | Mansfield, III | G06F 40/174 |
| 11,003,862 B2* | 5/2021 | Aggarwal | G06N 20/00 |
| 2006/0123042 A1* | 6/2006 | Xie | G06F 16/9577 |
| | | | 707/999.102 |
| 2009/0248608 A1* | 10/2009 | Ravikumar | G06F 16/9577 |
| | | | 706/55 |
| 2010/0312728 A1* | 12/2010 | Feng | G06F 16/954 |
| | | | 706/12 |
| 2011/0035345 A1* | 2/2011 | Duan | G06Q 10/10 |
| | | | 706/46 |
| 2011/0173527 A1* | 7/2011 | Zunger | G06F 40/143 |
| | | | 715/234 |
| 2012/0005686 A1* | 1/2012 | Rajan | G06F 40/137 |
| | | | 718/105 |
| 2014/0101119 A1* | 4/2014 | Li | G06F 16/3331 |
| | | | 707/706 |
| 2016/0070677 A1* | 3/2016 | Seabright | G06F 40/117 |
| | | | 715/243 |
| 2016/0307067 A1* | 10/2016 | Filimonova | G06V 10/40 |
| 2017/0278015 A1* | 9/2017 | Miranda | G06N 20/00 |
| 2018/0260389 A1* | 9/2018 | Bahrami | G06F 40/30 |

* cited by examiner

MACHINE LEARNING SYSTEMS AND METHODS FOR AUTOMATICALLY TAGGING DOCUMENTS TO ENABLE ACCESSIBILITY TO IMPAIRED INDIVIDUALS

CROSS-REFERENCE TO RELATED APPLICATION(S)

This application claims a benefit of priority under 35 U.S.C. § 119(e) from U.S. Provisional Application No. 62/976,808, filed Feb. 14, 2020, entitled "MACHINE LEARNING SYSTEMS AND METHODS FOR AUTOMATICALLY TAGGING DOCUMENTS TO ENABLE ACCESSIBILITY TO IMPAIRED INDIVIDUALS," which is fully incorporated by reference herein for all purposes.

TECHNICAL FIELD

This disclosure relates generally to generating documents that include accessibility features, and more particularly to systems, methods, and products for examining structured PDF files to collect training data, training a machine learning engine using the data collected from the structured PDF files, and processing unstructured PDF files which do not have accessibility tagging and document object model (DOM) structures to generate structured PDF files with these features.

BACKGROUND

Millions of people in the United States have a visual disabilities. Specifications (e.g., such as PDF/UA, WCAG, HHS Section 508, etc.) have therefore been developed for the annotation of PDF documents with tags that can enable accessibility by those who are visually impaired. PDF/UA support is of interest to persons with disabilities who require or benefit from assistive technology when reading electronic content. PDF/UA-conforming files, using readers and assistive technology, can provide equal access to information. The benefits of PDF/UA may also extend beyond people with disabilities. With support for PDF/UA, reader software will be able to reliably reflow text onto small screens, provide powerful navigation options, transform text appearance, improve search engine functionality, aid in the selection and copying of text, and more.

Specifications have therefore been developed for the annotation of PDF documents with tags that can enable accessibility by those who are visually impaired. The system can then apply that knowledge as it performs document layout analysis on new unstructured PDF documents so that tags (e.g., accessibility tags) can be added to those documents that describe their logical structure. The resulting PDFs produced by the system meet the requirements of many relevant specifications, such as PDF/UA, WCAG, HHS Section 508, etc. for document accessibility.

SUMMARY

The present disclosure details systems, methods, and products for automatically tagging unstructured PDF or similar documents with accessibility tags. A machine learning auto tagging solution that can be used in a system that provides output document transformation provides a way for users to train the system to understand the logical structure of existing PDF documents that have been annotated with PDF tags such as may be used to enable accessibility by those who are visually impaired. The system can then apply that knowledge as it performs document layout analysis on new unstructured PDF documents so that tags (e.g., accessibility tags) can be added to those documents that describe their logical structure. The resulting PDFs produced by the system meet the requirements of many relevant specifications, such as PDF/UA, WCAG, HHS Section 508, etc. for document accessibility.

One embodiment comprises a method for generating tagged PDF documents from untagged PDF documents. In this method, a set of tagged pdf documents is obtained, wherein each of the tagged PDF documents includes one or more visual elements and a document object model (DOM) structure. Each tagged PDF document is pre-processed to organize visual elements of the document into graphical objects. Each tagged PDF document is then processed to identify relationships between the graphical objects and corresponding elements of the DOM structure, and to generate training records corresponding to the identified relationships. A machine learning model is then trained using the training records, which trains the machine learning model to determine DOM structure elements that are associated with corresponding graphical objects. A set of untagged PDF documents is then obtained, and each of the untagged PDF documents is automatically tagged. The tagging includes identifying one or more graphical objects contained in the untagged PDF document, determining a DOM structure element corresponding to each of the identified graphical objects using the trained machine learning model, and generating a tagged PDF document corresponding to the untagged PDF document, where the tagged PDF document contains the graphical objects contained of the untagged PDF document, as well as the corresponding DOM structure elements identified by the trained machine learning model.

In some embodiments, the pre-processing of the tagged PDF documents includes parsing the tagged PDF document to identify visual elements of the document, grouping the identified visual elements into visual objects, determining a visual bounding box corresponding to each of the visual objects, determining for each of the visual objects whether the visual object is a foreground element or a background element, and generating a cluster tree by performing a plurality of cuts which segment the PDF document into multiple visually separated pieces.

In some embodiments, a size of the visual bounding box is different than an extent of the visual object.

In some embodiments, the method also includes pruning the cluster tree by recombining a plurality of leaves of the cluster tree.

In some embodiments, grouping the identified visual elements into visual objects comprises grouping text elements and grouping image elements. In some embodiments, the text elements comprise text characters and the text characters are grouped based on text size, font, position, and direction.

In some embodiments, identifying the one or more graphical objects contained in the untagged PDF document is performed in the same manner by which the one or more graphical objects contained in the tagged PDF document are identified.

In some embodiments, the processing of the tagged PDF documents includes identifying groups of visual objects that are closely positioned visually in the PDF document, identifying elements of the DOM structure that correspond to the identified groups of visual objects and associating the identified elements of the DOM structure with the corresponding groups of visual objects, identifying region segment features which are leaves on the cluster tree and storing indications of neighboring region segment features in the training records.

In some embodiments, the method further includes generating a plurality of training files, where each of the training files contains one or more of the generated training records, and where each training file corresponds to a distinct classifier of the machine learning model. In some embodiments, the classifiers include a text separator classifier, a cluster cut classifier, a cluster join classifier, a layout features classifier, a table cluster join classifier, a complex table cell classifier, and a region segment.

Numerous alternative embodiments may also be possible. For example, one alternative embodiment comprises a system having a processor and a memory, where the memory stores instructions that are executable by the processor to perform a method as described above. Another alternative embodiment is a computer program product comprising a non-transitory computer-readable medium which stores instructions that are executable by a processor to perform a method as described above. Other alternative embodiments will be apparent to skilled artisans upon reading this disclosure.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Figure 1:
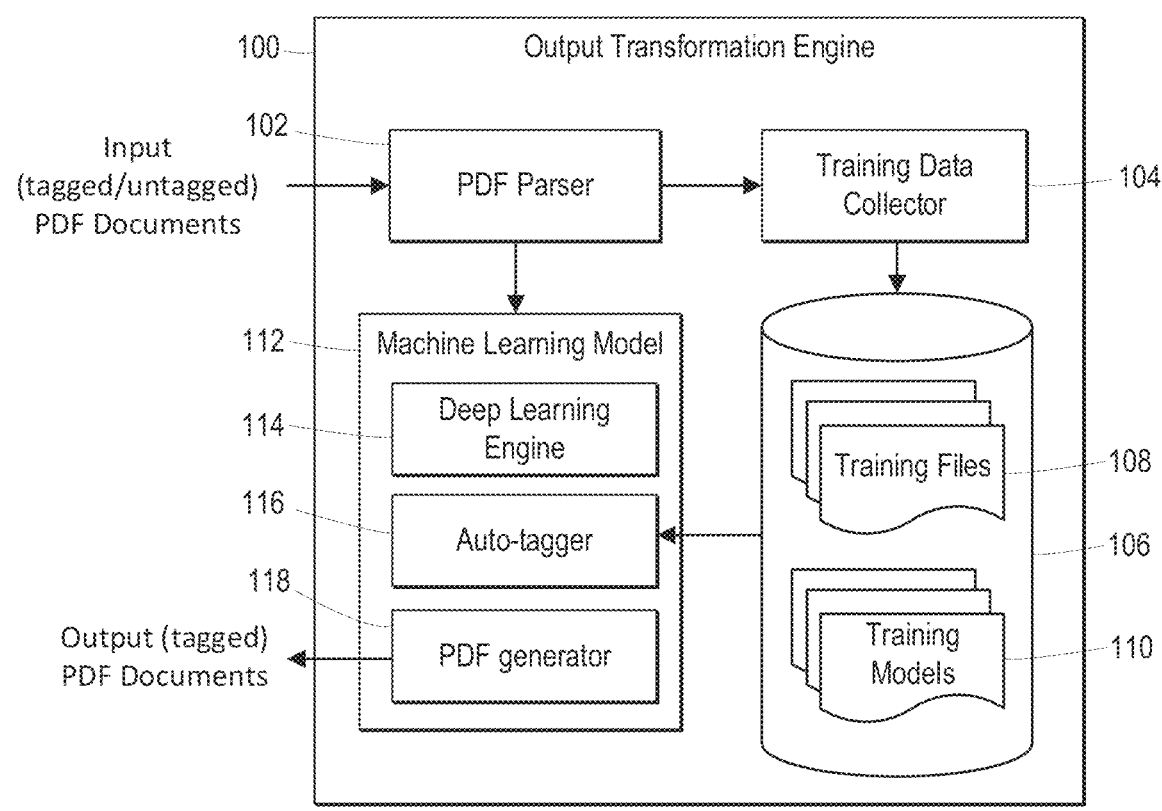
FIG. 1 is a flow diagram illustrating an exemplary training data collection process in accordance with some embodiments.

Referring to FIG. 1, a diagram illustrating the structure of a system for automatically tagging unstructured PDF files in accordance with some embodiments is shown. In this embodiment, an output transformation engine 100 is implemented in a computer system having one or more processors and one or more memories for storing instructions to be executed by the processor to implement the functionality disclosed herein.

In this embodiment, output transformation engine 100 includes a PDF parser 102, a training data collector 104, a data store 106 and a machine learning model 112. Machine learning model 112 includes a deep learning engine 114, an auto-tagger 116 and a PDF generator 118. Although not explicitly shown in the figure, the system may include a user interface such as a document accessibility web application which enables the input of tagged and untagged PDF documents to output transformation engine 100, and further enables the output of tagged PDF documents generated by the output transformation engine.

As will be discussed in more detail below, output transformation engine 100 is configured to receive structured PDF documents which include tags in accordance with various accessibility specifications. These structured PDF documents may also be referred to herein as tagged PDF documents. The tagged PDF documents are received by PDF parser 102, which parses the document into a set of Java objects. For each of the tagged PDF documents, the corresponding parsed objects and a corresponding DOM structure are provided to training data collector 104. Training data collector 104 preprocesses the parsed documents to organize the corresponding objects and identifies relationships between these objects and elements of the corresponding DOM structures. The identified relationships are recorded in training files 108 that are stored in data store 106.

Training files 108 are provided to machine learning model 112, and are used to train deep learning engine 114 to identify DOM structure elements that are associated with corresponding objects within PDF documents. This may be persisted via training models 110 which are stored in data store 106.

After machine learning model 112 has been trained, unstructured (untagged) PDF documents which do not have accessibility tags or an associated DOM structure are provided to PDF parser 102 of the output transformation engine. PDF parser 102 parses the untagged PDF documents and provides the parsed components of the document to machine learning model 112. Auto tagger 116 of the machine learning model examines the received unstructured document information and analyzes this information using classifiers implemented in deep learning engine 114. Auto tagger 116 thereby identifies elements of the unstructured PDF documents that correspond to DOM structure elements as learned based on the previously processed tagged PDF documents. The identified DOM structure elements are used to create a DOM structure for each untagged PDF document input to the system. This DOM structure and the graphic elements of the PDF document are used by PDF generator 118 to generate a tagged PDF document corresponding to the input untagged document. The tagged PDF document output by the system includes the same graphical elements as the untagged input document, but also includes accessibility tags according to the appropriate specifications and a DOM structure which was not present in the input document.

Output Transformation Components

Various output transformation system components are incorporated into the system to enable the disclosed solution. In one embodiment, the system has an Output Transformation Engine (OTE) and a Document Accessibility web application. The OTE in this embodiment includes a PDF Parser component, DOM Structures, a Training Data Feature Collector component, an Auto Tagging component, and a PDF Generator.

Output Transformation Engine

The Output Transformation Engine (OTE) provides the technology to parse, manipulate and generate PDF files. It uses a component based workflow configuration that allows users to chain together components to perform the desired tasks. The OTE provides a way to run hands-free batch processing tasks to train the system and also apply the machine learning auto tagging analysis to make PDF accessible.

PDF Parser Component

The PDF Parser component reads PDF files that are provided to the system and breaks the files down into a collection of Java objects. The objects may represent different items such as the entire page, individual fonts, and individual elements (e.g., words and images).

DOM Structures

When a PDF that is being parsed contains tags that describe the logical structure of the document, a DOM structure is created. The DOM structure reflects the tag tree structure and the relationship of individual page elements associated with each individual tag. The DOM framework in the Output Transformation Engine is a custom implementation of the World Wide Web Consortium (W3C) DOM architecture (see https://www.w3.org/DOM). The system uses a machine learning engine in which this DOM structure is examined during the processes that collect training data. After the machine learning engine is trained, the auto tagging processes can be executed create new DOMs which are used to apply document layout analysis to unstructured PDFs.

Training Data Feature Collector Component

The Training Data Feature Collector component utilizes the PDF objects and DOM structure of a properly tagged PDF to collect training data from the PDF. A complex set of machine learning features are collected from each page in the document and stored in a collection of feature vectors (See https://en.wikipedia.org/wiki/Feature_(machine_learning).

Auto Tagging Component

The Auto Tagging component examines the content of an unstructured PDF that is not tagged (i.e., has no existing DOM structure) and uses the system's machine learning functionality to build a new DOM that represents the structure of the PDF. The Auto Tagging component relies on an underlying MLAutoTaggerAPI to provide the machine learning functionality. This API is also used by the user interface (UI) based Document Accessibility solution which is described in more detail below.

PDF Generator

The PDF Generator re-assembles the objects of a parsed PDF into a new PDF file and uses a DOM structure to create the PDF tags inside the newly generated PDF file.

Document Accessibility Web Application

The Document Accessibility component in one embodiment is a UI based web application that enables users to interact with the PDF documents they upload to the system in order to ensure that they contain a valid tag structure for accessibility compliance. This component uses the output transformation engine in its backend architecture, so the PDF Parser, DOM Structures and PDF Generator described above are used in this component as well, but are hidden from the user.

The Document Accessibility component uses the same Training Data Feature Collector as the output transformation engine, but does not use the Auto Tagging component directly. Instead, the Document Accessibility component interfaces with the same underlying MLAutoTaggerAPI to take user driven actions from the UI and translate them into the corresponding behavior.

The output transformation system is configured to perform several different types of processes. These include Training Data Collection Processes, Training Processes, and Document Auto Tagging Processes. During the Training Data Collection Processes, structured PDF files are collected and processed to extract information from the PDFs, generate data structures using the extracted information, and generate new information that will be used to train the machine learning engine. The output transformation system is then trained with the information that was collected or generated and stored during the Training Data Collection Processes. After the system's machine learning engine has been trained, unstructured documents (untagged documents that do not contain an existing DOM structure) are provided to the output transformation system during the Document Auto Tagging Processes, during which the features of the documents are identified and tagged, and DOM structures for the documents are generated.

Training Data Collection Process

Overview of the Typical Training Data Collection Process

Figure 2:
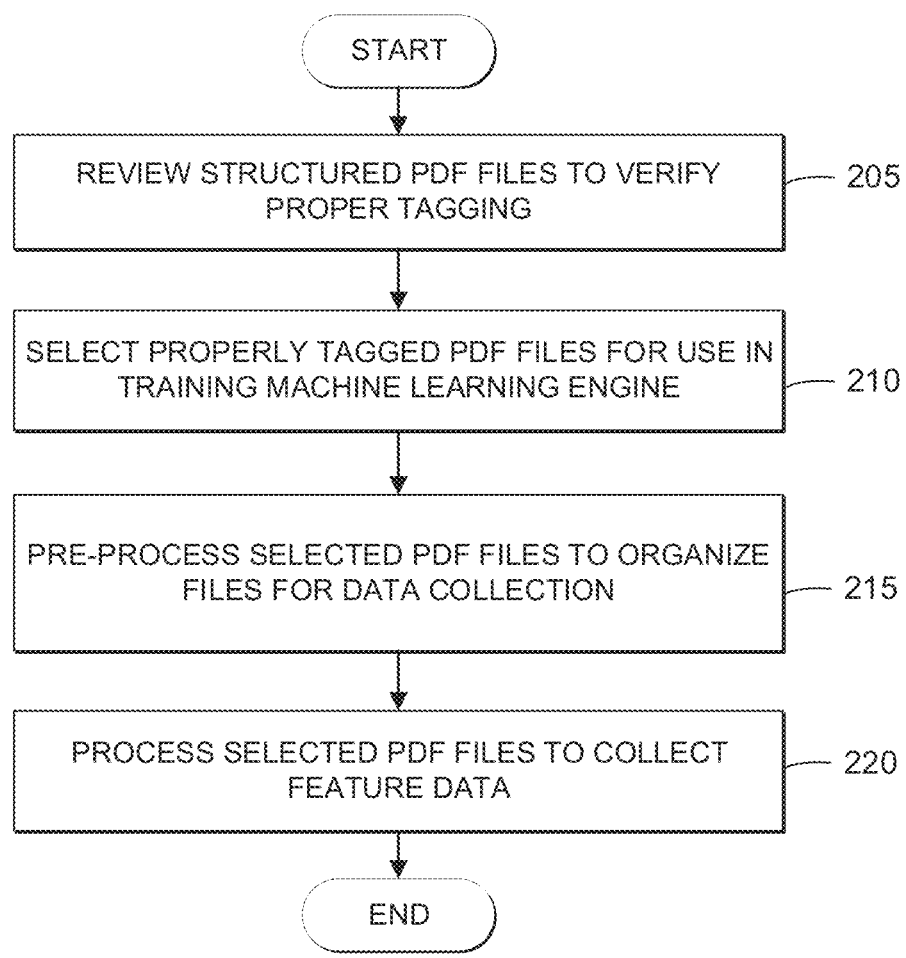
FIG. 2 is a flow diagram illustrating an exemplary training data collection process in accordance with some embodiments.

An exemplary training data collection process is illustrated in FIG. 2. In this example, a set of PDF files that may be used as training data is reviewed to determine whether they are correctly tagged (205). After the files have been reviewed and determined to be correctly tagged according to their document structure, a set of PDF files to be used as training data is selected (210). The selected files are fed one at a time through the output transformation engine using a project configuration which is designed for data collection. Each of the selected PDF files is pre-processed to organize the files for collection of training data (215). The pre-processed PDF files are then processed to collect feature data from the files (220). The features of the PDF filed are collected into various data files that will be used to train the machine learning engine.

Figure 3:
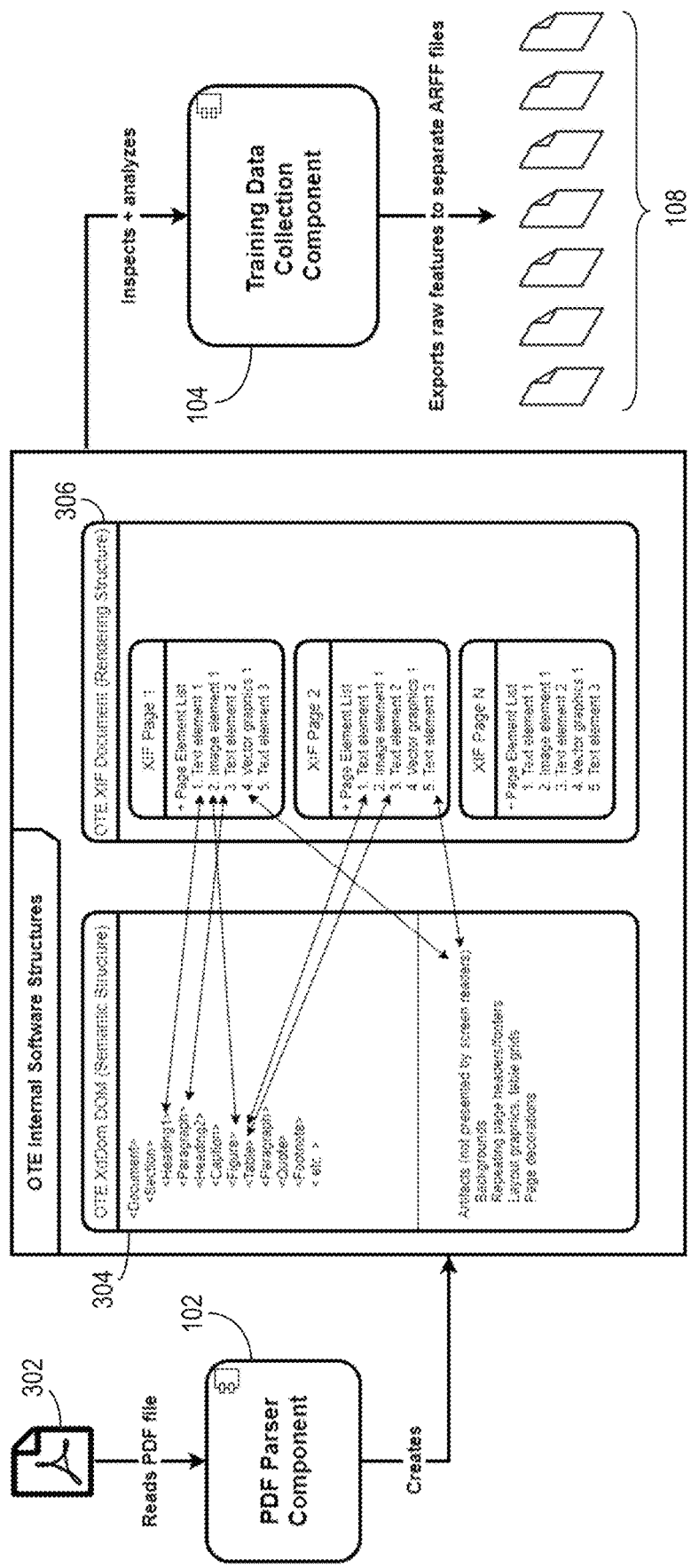
FIG. 3 is a flow diagram illustrating an exemplary training data collection process in accordance with some embodiments.

Referring to FIG. 3, a diagram illustrating the generation of training files from structured PDF documents in accordance with some embodiments is shown. As depicted in this figure, a structured PDF document 302 is received by PDF parser 102 of the output transformation engine. Structured PDF document 302 includes accessibility tags and a DOM structure. PDF parser 102 parses the received document and creates internal data structures for use within the output transformation engine. These data structures include a semantic structure 304 and a rendering structure 306. Rendering structure 306 includes graphical objects contained in the PDF document. Semantic structure 304 includes DOM elements of the received structured PDF document.

These data structures are inspected and analyzed by training data collector 104 to identify relationships between the graphical objects and the elements of the DOM structure. The related graphical objects and DOM structure elements are exported as records to training files 308 (e.g., ARFF files) which will be used to train the machine learning model. Each of the separate training files is used to train a corresponding classifier of the machine learning model. These classifiers will be used by the machine learning model to identify graphical objects of later-processed unstructured PDF documents so that tags can be associated with these objects and a DOM structure including these tags can be constructed.

As noted above, before the output transformation system can be trained, training data is first collected. Training data is collected from structured PDFs that are already properly tagged. The tags in these PDFs essentially annotate the content of the PDF to describe its logical structure and preferred reading order.

The logical structure describes elements including, but not limited to:
Headings
Paragraphs
Footnotes
Figures
Tables (rows & columns)
Lists (list labels and bodies)
Table of contents
References
Links
Math formulas
Fillable forms
Quotes/Blockquotes The PDF tagging format is documented in the PDF 1.7 (ISO 32000-1:2008) specification, section 14.8.

Training Data Files

Figure 12:
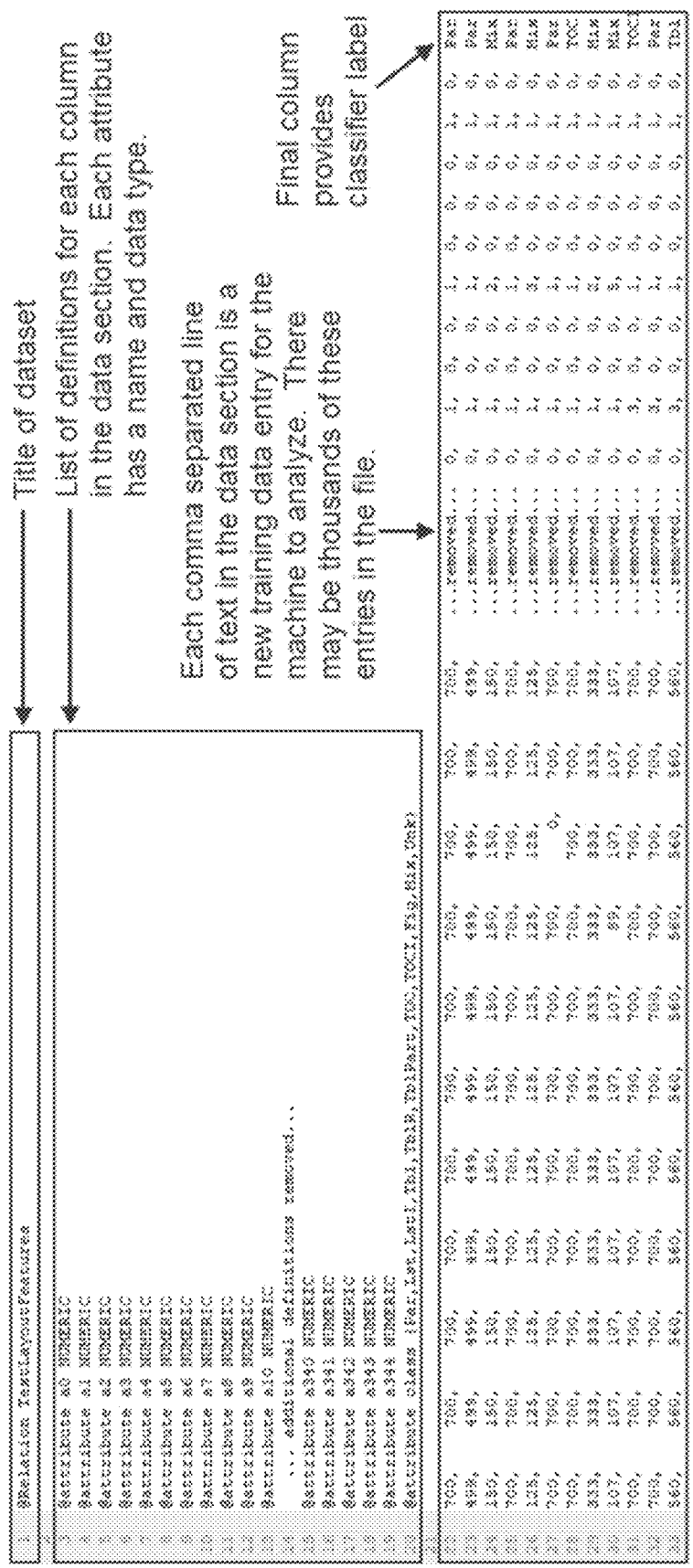
FIG. 12 is a diagram illustrating an example of a training file corresponding to a classifier for text layout features in accordance with some embodiments.

In one embodiment, data which is extracted from the structured PDF files during the training data collection process is stored in a training file which may have, for example, a CSV-like file format called ARFF. This file format was originally developed for the popular machine learning library called WEKA. More information on the ARFF format can be found at https://waikato.github.io/weka-wiki/formats_and_processing/arff/#data-format and https://datahub.io/blog/attribute-relation-file-format-arff. An example of a training file for text layout features in an ARFF format is shown in FIG. 12.

In one embodiment, seven separate ARFF files are used by the system. Each one of these ARFF files is used to train a separate machine learning classifier of the machine learning engine. These classifiers are used at different stages in the automated machine learning document analysis. The seven classifiers are:
1. Text Separator classifier
2. Cluster Cut classifier
3. Cluster Join classifier
4. Layout Features classifier
5. Table Cluster Join classifier
6. Complex Table Cell classifier
7. Region Segment classifier The functions of the different classifiers are explained in more detail below.

Page Pre-Processing

Figure 4:
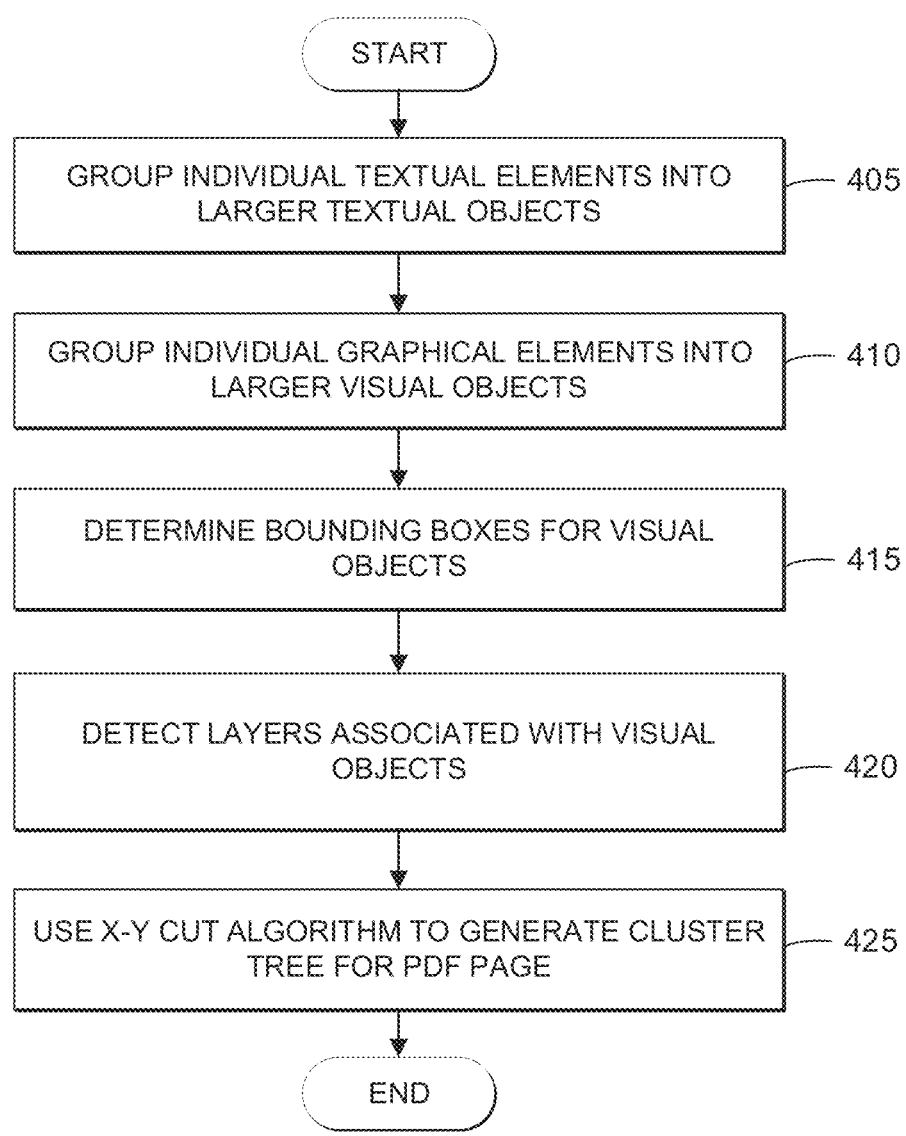
FIG. 4 is a flow diagram illustrating an exemplary method for pre-processing structured PDF files in accordance with some embodiments.

The page pre-processing stage involves some organization of the graphical objects that make up the page structure. These actions assist in the later stages of page analysis. An exemplary method for pre-processing the selected structured PDF files is illustrated in the flow diagram of FIG. 4. In this embodiment, the page pre-processing actions include Text Grouping (405) Grouping Objects (410), identifying Visual Bounding Boxes (415), detecting Layers (420), and generating Cluster Trees (425). Each of these steps will be described in more detail below.

Text Grouping (405)

The PDF format provides flexibility in the how text structures are defined in the PDF file by software that produces PDF. For example, the word "Hello" could be a single text command in the PDF or five separate commands that position each letter of the word individually in any sequence. As long as each character is positioned in the correct (x,y) position on the page, then the file will be viewed by a user correctly. This can lead to excessive fragments of partial words and sentences. Alternatively, a text command may contain a large amount of text that spans multiple tags, such as a Paragraph and a Table cell. Therefore, as the text commands inside the PDF may not provide any accurate indication of the semantic structure, all text strings are split on whitespace characters.

The first step in the Text Grouping involves connecting partial words based on proximity of characters on the page. This provides a normalized set of text elements resembling "words" that are used in the remaining steps of the grouping process.

Subsequent steps involve using a static (hard coded) algorithm for comparing text elements to look for "word" elements that can be grouped together to form units of words that would belong to a common PDF tag (e.g. are part of the same line of text in a paragraph or table cell). These includes properties such as text size, fonts, baseline page position and print direction. Machine learning training data is collected during this comparison to learn which potential joins are valid to prevent joining of text that should not occur. This information will train the Text Separator classifier. To support this, potential joins in the training data are compared to the DOM structure of that training data to determine if the two text elements belong together in the same tag. Features of these neighboring text elements and their surrounding elements such as line draws are collected and stored in the ARFF files. This factors in graphical separators such as table cell borders or horizontal separators between paragraphs.

Visual Object Grouping (410)

Some PDF files contain many individual small elements that are used to represent a larger single visual element. For example, a graphic such as pie chart or logo might be made up of many small curves, line draws, fills, etc. In extreme cases, there could be elements that are composed of hundreds or thousands of such small elements. For efficiency purposes, the system detects these composite elements and creates a single grouping element to hold them. This enables the system treat the collection of associated small elements as a single element. These groups may be detected, for example, when there are multiple sequences of PDF draw commands in a row that appear to form a larger object.

Visual Bounding Box Calculations (415)

Figure 5A:
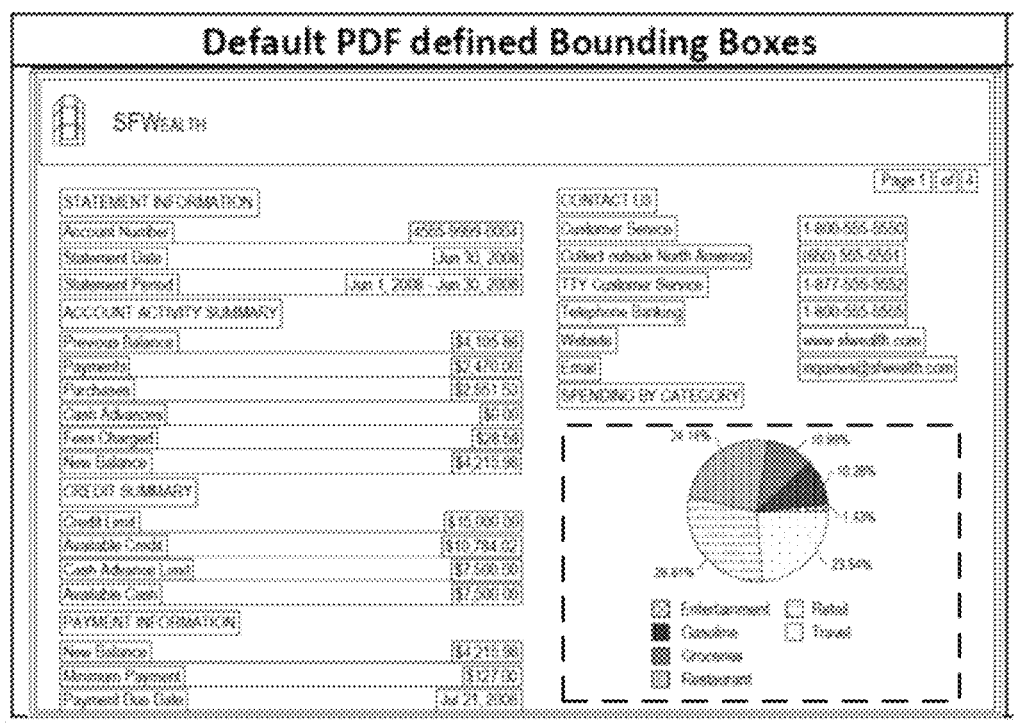
FIGS. 5A and 5B are diagrams illustrating an example showing the difference between a full image and the corresponding visual bounding box.
Figure 5B:
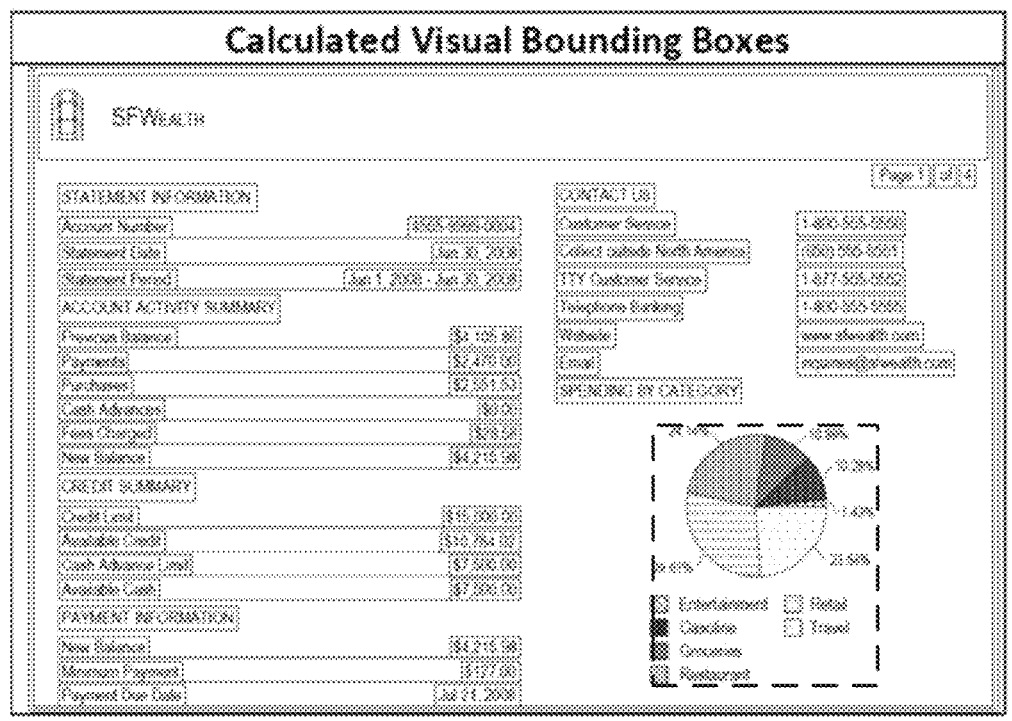

Every graphical object in the PDF file, such as a piece of text, or an image (e.g., a JPG or vector graphics image) has a defined area. Sometimes, part of that area is invisible to the human eye. For example, a JPG image may be a company logo on a white background. The entire image may be 500×500 pixels, but the logo itself may only make up 300×300 pixels in the center of the image's canvas, so the visual bounding box size (300×300) is different than the actual extent (500×500) of the image. To assist in the page analysis in one embodiment, the system iterates through all graphical objects on the page and calculates the "visual bounding box" for each object. Referring to FIGS. 5A and 5B, an example showing the difference between a pie chart image (including white space as shown in FIG. 5A) and the computed bounding box for the pie chart (FIG. 5B) is shown.

On a technical level, the process of determining a visual bounding box involves the use of multiple canvases in memory. Elements are drawn to the base canvas one at a time until the page is completely rendered in memory. After each element is drawn, it is compared to the previous results to track what has changed on the page at the pixel level. The pixels are also compared to the final rendering of the page to see how much of the page element is visible on the completely rendered page. In this manner, the system detects whether the element has been fully or partially hidden by another foreground element.

Layer Detection (420)

The layer detection step involves the detection of foreground and background elements. The layer detection step makes use of the visual bounding boxes to determine which elements overlap each other.

Cluster Tree Generation (425)

The process of generating a cluster tree for a PDF page involves looking at the page as a whole image and using an XY Cut algorithm to break or segment the page or its elements into small pieces based on an associated "cut factor". The cut factor for a piece of the page that is being considered. The strongest cut factor may be based on multiple factors, such as the largest amount of white space gap between elements, lines or other graphical dividers that indicate a strong separation between elements, a change from one element type to another (e.g., text followed by images), or the like.

Potential cuts are evaluated to confirm or reject them. Training data is collected here for the Cluster Cut classifier by extracting features about both areas that would result from the potential cut and their relationship in the DOM tree. If both pieces belong to the same DOM node, they should not be cut.

Figure 6A:
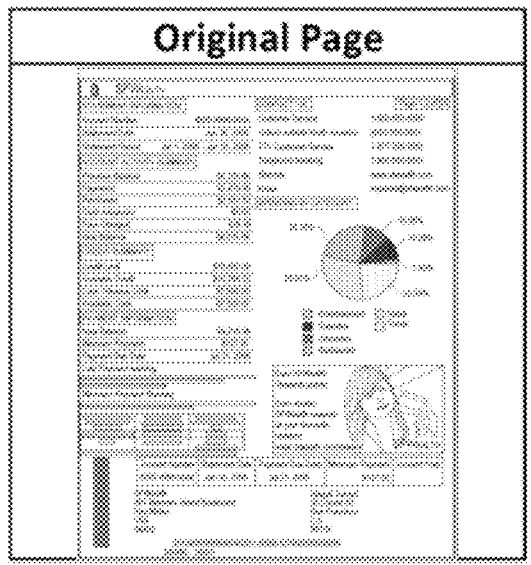
FIGS. 6A-6D are diagrams illustrating segmented an example of a page being broken into pieces based on a cut factor algorithm in accordance with some embodiments.
Figure 6B:
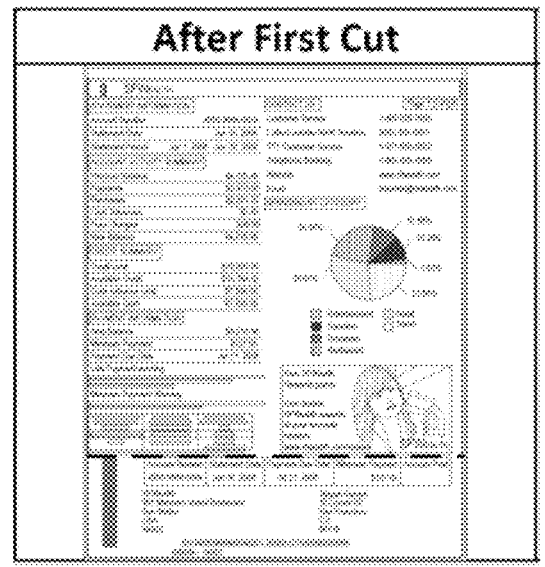
Figure 6C:
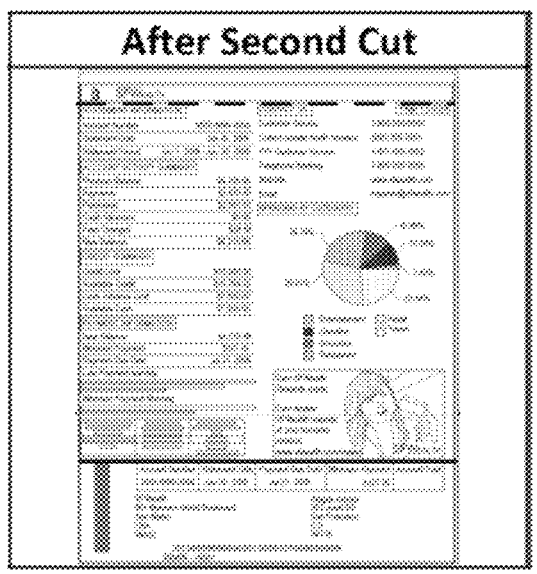
Figure 6D:
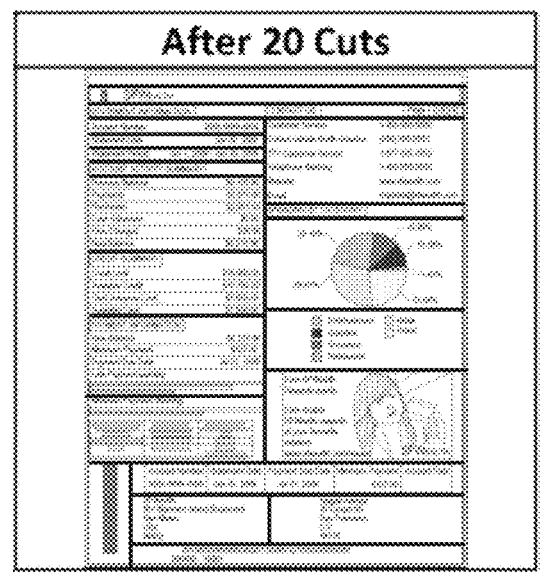

In the cluster tree generation process, the PDF page is first split into two pieces based on the strongest cut factor, then each of those pieces may be cut into two pieces based on the strongest cut factor for each of the pieces. This process continues recursively until the page is cut up into very small pieces. Referring to FIGS. 6A-6D, an example of a page being segmented or broken into pieces based on the strongest cut factor is shown. FIG. 6A shows the unsegmented page. FIG. 6B shows the page after the first cut (depicted by the dashed line), FIG. 6C shows the page after the second cut (depicted by the dashed line), and FIG. 6D shows the page after twenty cuts (depicted by the bolded lines).

Figure 7:
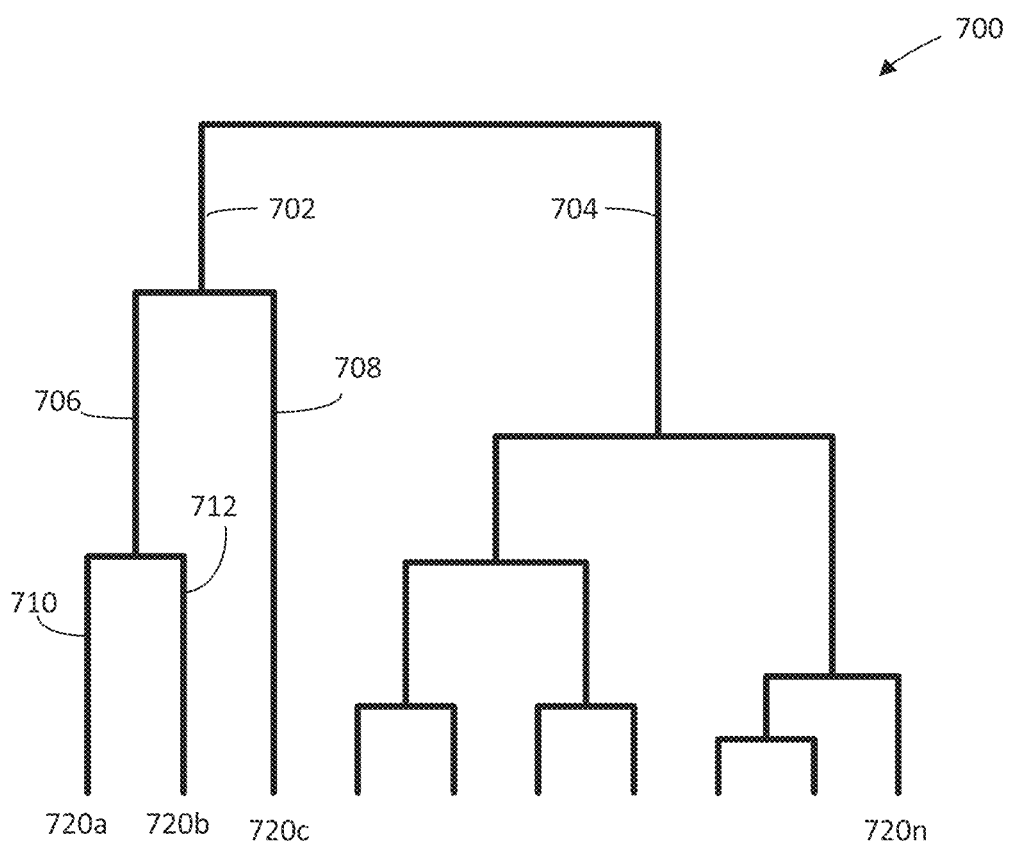
FIG. 7 is a flow diagram illustrating an example of formation of a cluster tree in accordance with some embodiments.

Referring to FIG. 7, a graphical representation of the formation of a cluster tree is shown. Each branch in tree 700 represents the two portions of a split. Thus, the page in this example is split into two pieces (702, 704). Piece 702 is then split into pieces 706 and 708, piece 706 is split into pieces 710 and 712, and so on. Each piece may (or may not) be split in a similar manner. The tree grows (in potentially unbalanced shapes) based on where the next dominant split occurs. At the bottom of each branch that does not split further is a leaf.

After the tree is generated, the tree is "pruned" to remove excess leaves. In other words, the splits may be reversed (the leaves recombined). For instance, it normally is not desirable for leaves to contain single words or partial words, so such leaves may be recombined so that the smallest units are fragments of text that contain sentences or logical fragments.

Page Processing

Figure 8:
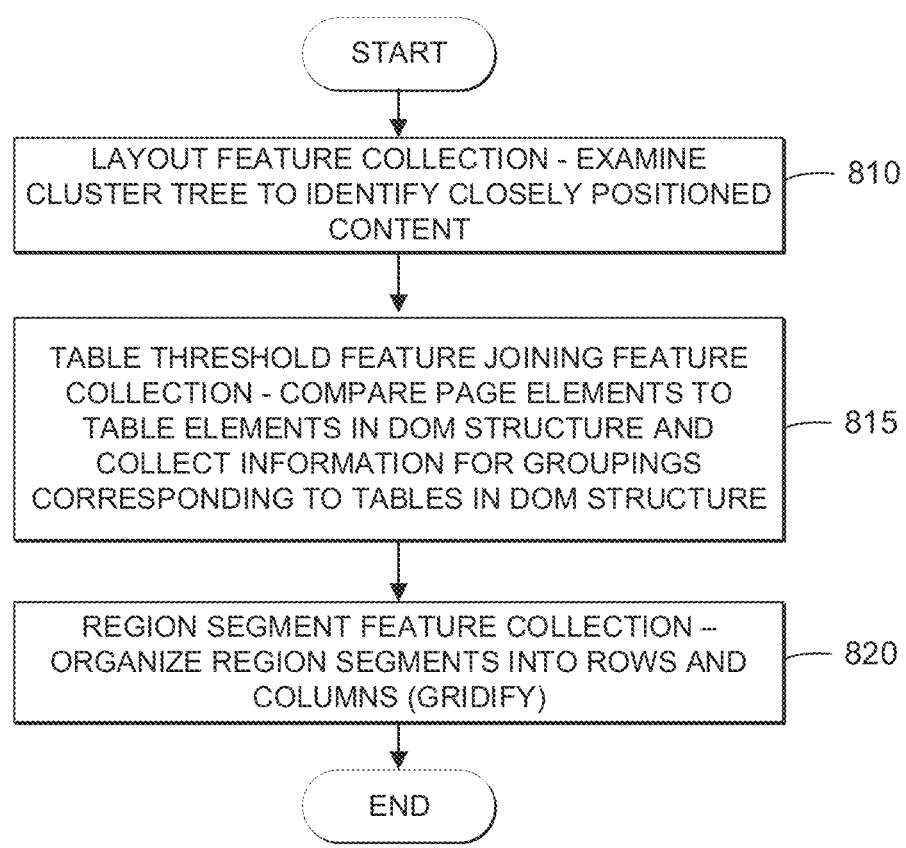
FIG. 8 is a flow diagram illustrating an exemplary method for processing structured PDF files to collect training data in accordance with some embodiments.

The page stage involves the processing of the page to collect features. An exemplary method for pre-processing the selected structured PDF files is illustrated in the flow diagram of FIG. 8. In this embodiment, the processing steps include Layout Feature Collection (810), Table Structure Threshold Joining Feature Collection (815), Complex Table Cell, and Region Segment Feature collection (820). Each of these steps will be described in more detail below.

Layout Feature Collection (805)

At the Layout Feature Collection stage, the cluster tree is examined to find blocks of content that are closely positioned to each other on the page. These effectively are branches that contain multiple leaves. The contents of these blocks are cross referenced with the DOM structure to determine the high-level structure with which these blocks are associated (e.g., list, table, table of contents, paragraph, etc.). These will be the labels assigned to the blocks in the training data record.

These structures may contain many substructures in the DOM (for example, a table consists of many rows and cells), but for this stage, these substructures are not observed. Instead, the system takes the entire contents of a structure such as a list or table and takes a basic fingerprint of its shape. The system renders each substructure into small (e.g., 80×80 pixel) "layout raster" thumbnail image and then creates a series of numeric values to represent its projections along the X axis and the Y axis.

Projections are calculated by performing a series of scans along each horizontal row and each vertical column of the grayscale raster bitmap and observing any non-white pixels that are encountered. Darker shades of gray or black are assigned a higher value than lighter shades of gray. This provides density information. The X-projection is calculated as a vector of average densities for each raster column. Similarly, the Y-projection is a vector of average densities of raster rows.

Figure 9A:
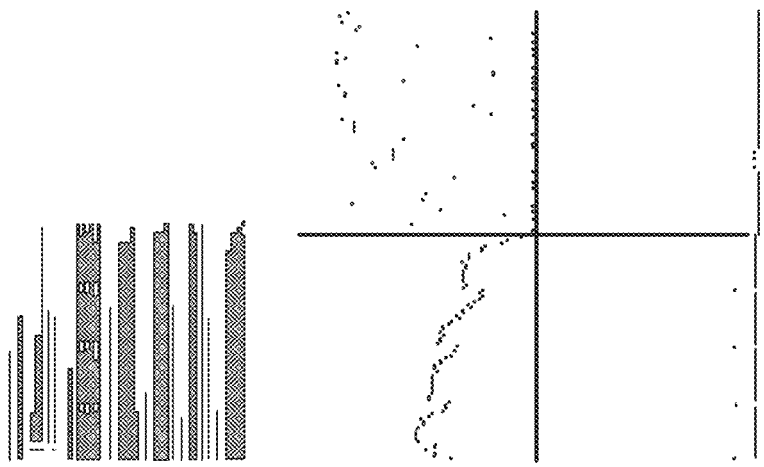
FIGS. 9A-9C are diagrams illustrating layout raster images and corresponding projections along X- and Y-axes in accordance with some embodiments.
Figure 9B:
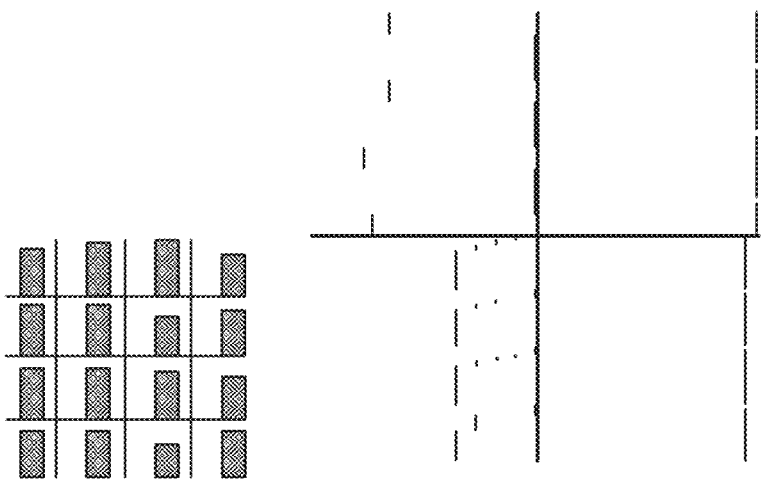
Figure 9C:
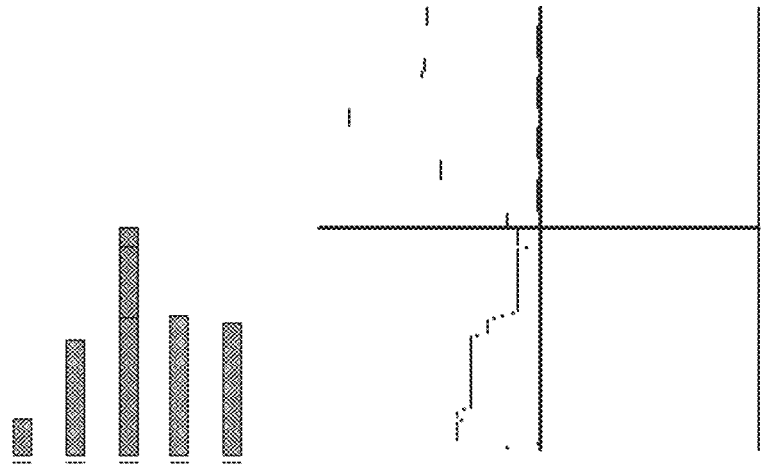

Referring to FIGS. 9A-9C, a set of examples are illustrated. Each of these figures includes a small layout raster image of the represented structure (at the top of the figure) and a corresponding projections along the X axis and the Y axis (at the bottom of the figure). FIG. 9A is a representation of a list structure, FIG. 9B is a representation of a table structure, and FIG. 9C is a representation of a mixed (unknown) structure, In FIGS. 9A-9C, rasters on the top of each figure represent combinations of foreground and background rasters for a list (FIG. 9A), a table (FIG. 9B) and an entire page (FIG. 9C). The charts on the bottom of each figure represent four projection vectors: X-projection of foreground raster on top-left, Y-projection of foreground raster on top-right, X projection of background raster on bottom-left and Y-projection of background raster on bottom-right. This information is saved along with its associated label from the DOM (e.g., list, table, text, mix, etc.) into a new record in the ARFF file.

Cluster Threshold Joining Feature Collection (810)

In the page preprocessing stage, a cluster tree is created for a page, breaking down the page into small pieces. This preprocessing stage is performed without the need to apply machine learning logic. In the context of collecting training data, the system compares the page elements (images, text, etc. which are associated with the leaves and branches on the cluster tree) to the elements in the DOM structure of the corresponding training data PDF. This enables the system to detect the corresponding relationships (e.g., these content of a specific set of leaves makes up a single table in the DOM). When the system detects this grouping, it collects information about the joined set of leaves and stores a training data record for that joining profile. By collecting this information, the machine learning engine can be trained to determine which leaves in a cluster tree for an unstructured document should be joined together to be tagged in a newly created structured document.

Table Structure Threshold Joining Feature Collection (815)

Tables are often the most complex structure type in a document. There are almost an infinite number of row/column combinations, with some cells that span multiple row and columns. The system provides a special status to tables and collects additional information on them that is not collected for other structure types. Much like for the Cluster Tree Thresholds, the system collects information on which cluster tree leaves are combined to form cells, and which groups of cells are combined to form a row.

Region Segment Features (820)

Region Segments are the smallest, outer leaves on the Cluster Tree after it has been pruned to remove leaves that are considered too small. The remaining leaves often represent a line of text or a single image object. In the training data PDFs, the page elements (text, image, vector graphics) inside the region segments are each associated with a PDF Tag (such as Paragraph, Heading 1, Table cell, etc.).

Many machine learning features (80+) are extracted for each region segment. These features may include:

X/Y bounding positional information

Font characteristics (e.g., size, style)

Font size ranking (the relationship of a font to the biggest/smallest font found on the page/document)

Location and presence of different character classes (alpha, numeric, symbols, currency, superscript, subscript)

Presence of graphical borders on any perimeter side (such as table cell borders, or text underlines)

The Region Segments are also organized into rows and columns with any neighboring Region Segments that are positioned above, below, left, or right of the region segment. This technique is sometimes referred to as a "Gridify" Process. Each region segment record in the ARFF file also includes information on each nearest neighbor in the row and/or column to which it belongs to for all four sides. This technique is very beneficial to the detection of table structures, but it may also be useful for detecting other structure types as well.

Figures 10A, 10B:
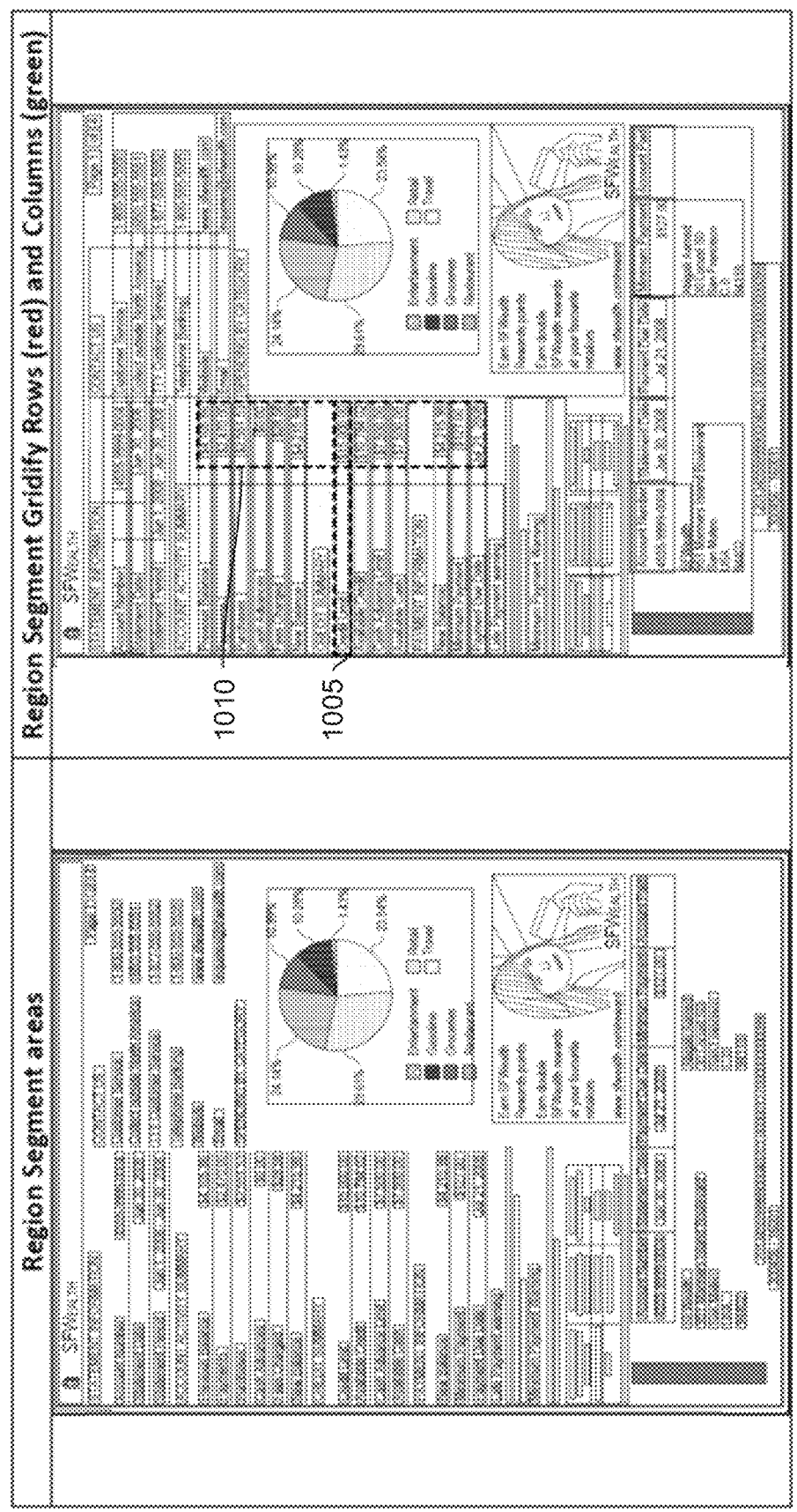
FIGS. 10A-10B are diagrams illustrating an example of a page that has been "gridified' in accordance with some embodiments.

Referring to FIGS. 10A and 10B, a pair of diagrams illustrating the result of the gridify process is shown. FIG. 10A shows a page prior to gridification, and FIG. 10B shows the page with the rows and columns of page elements identified. In this example, one of the rows (1005) and one of the columns (1010) are shown by dotted lines.

Training Process

After the training data collection process is complete and the ARFF dataset files are populated with raw features data, the training process can begin. The training process in one embodiment uses existing third-party open source libraries (e.g., Deeplearning4J, Spark ML). A customized wrapper framework is created to provide a layer of abstraction around the third-party libraries. This allows the system to plug and play different libraries, and allows configuration of the type and complexity of the Neural Networks used for training.

Figure 11:
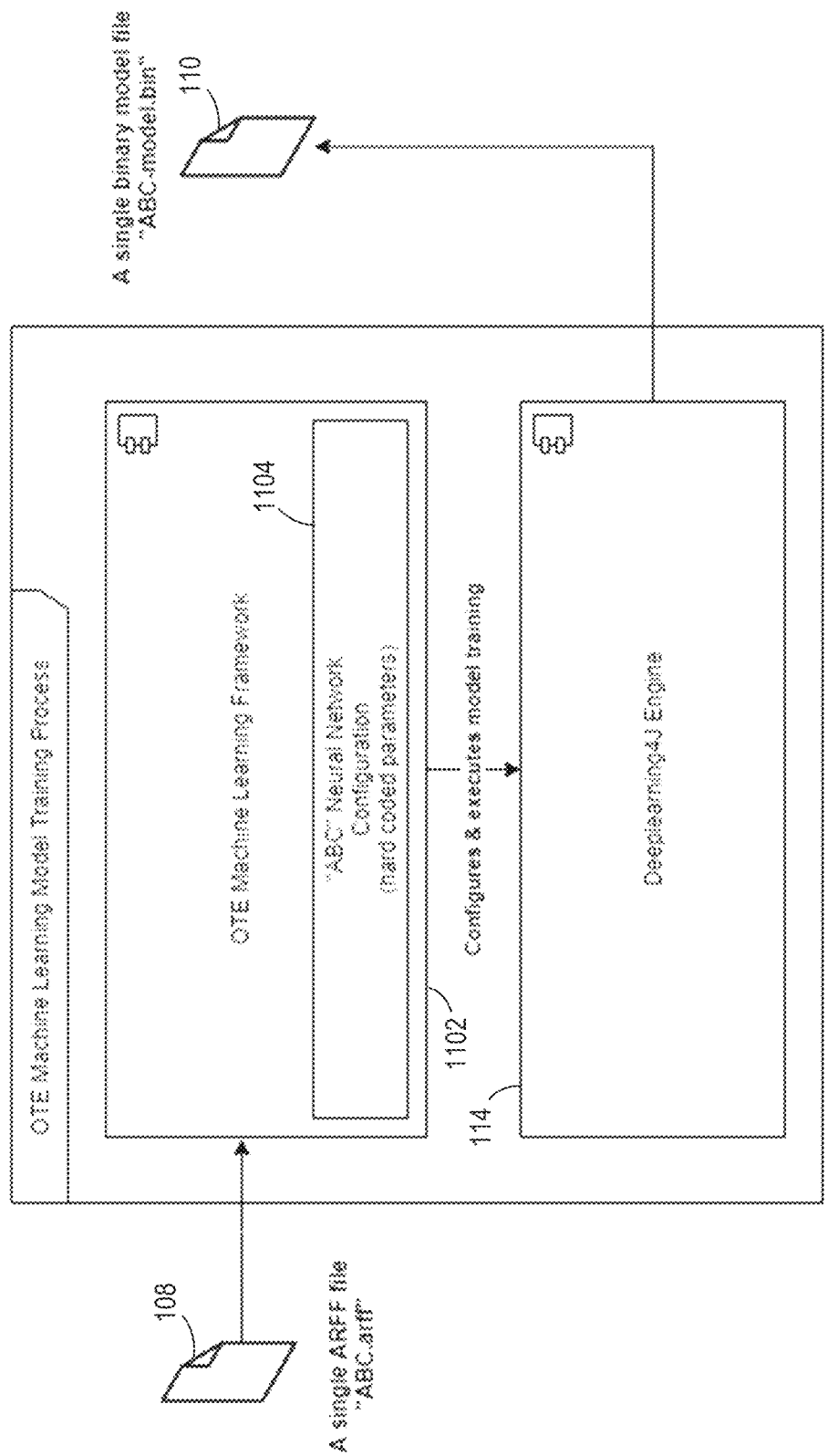
FIG. 11 is a diagram illustrating the generation of a model file from a training file in accordance with some embodiments.

Referring to FIG. 11, a diagram illustrating the generation of a model file from a training file in accordance with some embodiments is shown. This figure depicts the use of a single one of training files 108 to generate a corresponding model file 110 for a corresponding classifier. In this example, training file 108 is provided to a machine learning framework 1102 of the output transformation engine. Machine learning framework 1102 includes parameters 1104 for the configuration of a neural network. This information is used to configure and execute training of a model on deep learning engine 114. The training of deep learning engine 114 results in the generation of a binary model file 110 corresponding to training file 108.

For each of the training data ARFF dataset files, the Neural Network is configured to specify the type of network and a set of tuning parameters that apply to that type of network. For example, for the region segment dataset, the configuration may look like:

ml.autotagger.model.RegionSegmentFeatures=MUL-
TILAYER_PERCEPTRON(1000,IN:0:200,H:
200:100,OUT:100:0)

where the type of Neural Network for this dataset is Multilayer perceptron, and the numeric values specify parameters that configure this type of network, including the number of training iterations, size of input layer, hidden layers, and output layers. The training process provided by the underlying library is initiated using this configuration. Once the training is complete, a binary model is produced for each of the four ARFF datasets. This is used to initialize the machine learning classifiers during the auto tagging process. A more detailed example of a training file (e.g., an ARFF file) corresponding to a classifier for text layout features is shown in FIG. 12.

Document Auto Tagging Process

Figure 13:
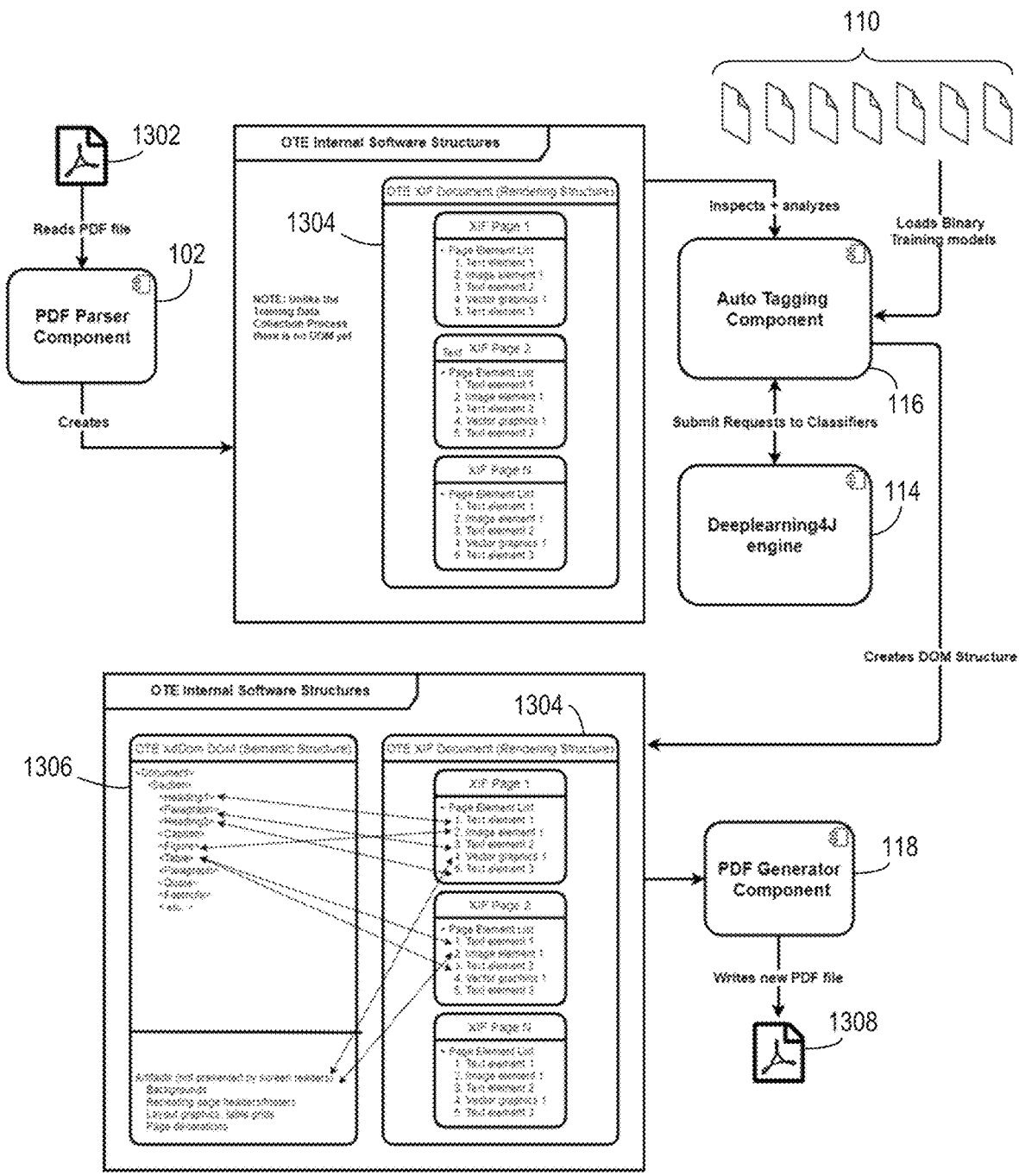
FIG. 13 is a diagram illustrating the processing of an untagged PDF document to generate a new, tagged PDF document in accordance with some embodiments.

Referring to FIG. 13, a diagram illustrating the processing of an untagged PDF document to generate a new, tagged PDF document in accordance with some embodiments is shown. In this embodiment, and unstructured PDF document 1302 which does not include accessibility tags is provided to PDF parser 102. Unstructured PDF document 1302 does not include a DOM structure, so PDF parser 102 generates an internal data structure 1304 (a rendering structure) which includes the graphical objects in the PDF document, but cannot create a corresponding semantic structure with DOM structure elements. This is distinct from the parsing of structured PDF document 302 as depicted in FIG. 3, where PDF parser 102 is able to generate a semantic structure corresponding to the structured PDF document.

Rendering structure 1304 which is created by PDF parser 102 is provided to auto tagger 116. Auto tagger 116 loads the training models that were previously generated by deep learning engine 114 based upon training files 308 which were generated by training data collector 104 (see, e.g., FIG. 3). Auto tagger 116 configures a set of classifiers on deep learning engine 114 according to the loaded binary training models, and submits requests to the classifiers for classification of the identified graphical objects in rendering structure 1304. The responses to these requests are used by auto tagger 116 to identify DOM structure elements corresponding to the graphical objects. The identified DOM structure elements are used to generate a semantic structure 1306. The arrows between graphical objects in rendering structure 1304 and DOM structure elements in semantic structure 1306 represent relationships between the elements of these two different structures. Rendering structure 1304 and semantic structure 1306 are then provided to PDF generator 118 which uses this information to generate a new, structured PDF document 1308 that contains accessibility tags which were not present in originally input PDF document 1302.

The Auto Tagging Process is executed in a few different contexts. The architecture consists of an API (MLAutoTaggerAPI) that provides the ability to tag complete pages, as well as individual regions within pages. This supports two main functional processes: Batch Processing; and a web based UI. In one embodiment, OTE Batch Processing takes a single PDF document and processes the document to automatically generate tags for the entire document from beginning to end without user intervention. The system then generates a corresponding new PDF document that includes the generated tags. In one embodiment, the system includes a Document Accessibility webapp which provides a web based UI. This UI enables users to visually interact with the document and initiate tagging on selected parts of the document, or on the entire document. Users can manually define and adjust the tag structure in combination with the auto tagging results.

Auto Tagging Logic

In each of the different contexts, the auto tagging process for an unstructured document follows the same core processing flow. As explained below, the initial steps for feature collection are the same as the processing performed during training data collection. Many features are collected for the content on the unstructured page, but the correct tags that should be applied to the content are unknown because no DOM exists for this content in the unstructured document. In general, the features are collected and then fed into the classifiers, which provide a result that can be applied to generate tags and a DOM structure for the document.

When the features for an unstructured PDF are fed into a classifier, the results are provided as a list of possible results, ranked with probabilities. For example, the Region Segment classifier may be provided with the features vector for a region segment, and the results returned may be as shown below in Table 1.

TABLE 1

| Predicted class type | Probability |
|---|---|
| Entire paragraph | 68% |
| Heading 3 | 22% |
| Table cell | 10% |

Page Pre-Processing

This initial stage uses the same processing steps as described in the training data collection stage: Object Grouping; Visual bounding box calculations; Layer detection; and Cluster tree creation. In this stage the Text Separator and Cluster Cut classifiers are consulted to ensure the Cluster tree is properly constructed. This prepares the system to begin to ask the remaining classifiers for their respective predictions.

Region Segment Collection & Classification

As in the equivalent step in the training data collection, the Region Segments are created. The Gridify process is performed to organize the Region Segments into row/column relationships, and their features are collected. The Region Segment classifier is called to predict the tag type that should be associated with each region segment, and these results are stored, but are not yet used at this stage.

Layout Features Classification

As described above with respect to the equivalent step in the training data collection, blocks are collected from the cluster tree and are fingerprinted to create a set of numeric projection values. This fingerprint is sent to the Layout Features classifier, which will provide predictions on what type of structure this block represents (e.g., list, table, paragraph).

Cluster Join Classification

As described above with respect to the equivalent step in the training data collection, the system tries to join groups of leaves on the cluster tree to identify whole elements, such as full paragraphs, lists, tables, etc. The system collects features on the clusters and requests the Cluster Joining classifier to provide the probability that these clusters should be joined together or not.

This step is performed iteratively with the Layout Features Classification until confidence is reached that the cluster is properly identified. This is done by creating clusters and feeding the clusters through the Layout Features Classifier. The Cluster Join Classifier is then used to determine whether the cluster being considered should be joined with another to make a larger cluster. If so, that larger cluster is processed through the Layout Features Classifier to determine how confident the classifier is that the new cluster is a whole unit. If the Layout Features Classifier predicts that the new cluster is a mixture of structure types, or is unknown, the new cluster should not be considered a whole unit, and the sequence of steps ends (without forming the larger cluster).

Finalization of Cluster Type

When the previous steps have been completed, the clusters have been sized and categorized. The contents of each cluster are then compared to all Region Segments that overlap that cluster. Each of those Region Segments also has a predicted label, as previously determined by the Region Segment Classifier. The results of the Layout Features classifier are compared to the Region Segment classifier results in order to determine whether there is agreement between them (e.g., both the Layout Features classifier and the Region Segment classifier agree that the contents are a table). If there is a conflict between the Layout Features classifier and the Region Segment classifier, the probabilities determined by the classifiers (e.g., the probability that the contents are a paragraph, versus a list, versus a table) are considered to make a final decision as to the type of the contents.

An example is shown in Table 2 below.

TABLE 2

| Layout Features Results | Region Segment Results | Final Choice |
|---|---|---|
| List = 50% Table = 46% Paragraph = 4% | Table = 70% List = 25% Paragraph = 5% | It is a Table. (Even though Layout Features predicted it was most likely a list, the Region Segment Features had a higher confidence in it being a table.) |

Final Assembly

Once the cluster has been identified, the process branches out to an appropriate assembly algorithm for each cluster type. For example, if the cluster is identified as a table, a table assembly algorithm (e.g., assembleTable( )) is executed, if the cluster is identified as a list, a list assembly algorithm (e.g., assembleList( )) is executed, and so on. In one embodiment, these algorithms may use minimal machine learning logic. The algorithms use the content of the clusters to build a final DOM structure that is then used by a PDF Generator to create an accessible, structured PDF. This structured PDF includes the generated tags and DOM structure that were not present in the original unstructured PDF file.

During table assembly algorithm the graphic content in this area is grouped into individual cells using the Table Cluster classifier. The table cell areas are then examined and the Complex Table Cell classifier is used to classify cells as either simple or complex. When an assembling table cell is classified as a complex table cell the selected graphic content is processed as an independent subpage recursively. The entire Page Processing steps are applied to this smaller area. This recursive tagging allows to table cell items to contain sub-headings, paragraphs, lists. The same recursive tagging process should be applied list structure to make a support complex list items (not yet implemented).

Embodiments of the technology may be implemented on a computing system. Any suitable combination of mobile desktop, server machine, embedded or other types of hardware may be used. One exemplary embodiment may be implemented in a distributed network computing environment. The computing environment in this embodiment may include a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The computer systems may include, for example, a computer processor and associated memory. The computer processor may be an integrated circuit for processing instructions, such as, but not limited to a CPU. For example, the processor may comprise one or more cores or micro-cores of a processor. The memory may include volatile memory, non-volatile memory, semi-volatile memory, or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory, or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

The memory may store instructions executable by the processor. For example, the memory may include an operating system, a page editing or processing program (e.g., a web browser or other program capable of rendering pages), a server program configured to extend the functionality of the page processing program or other server code. Further, the memory may be configured with a page processable (e.g., capable of being rendered by) by the page editing program. The page may be the local representation of a page, such as a web page, retrieved from the network environment. As will be appreciated, while rendering the page, the page editing/processing program may request related resources, such as style sheets, image files, video files, audio files and other related resources as the page is being rendered and thus, code and other resources of the page may be added to the page as it is being rendered. Application server code can be executable to receive requests from client computers, generate server page files from a set of page assets (e.g., complete web pages, page fragments, scripts, or other assets) and return page files in response. A page file may reference additional resources, such as style sheets, images, videos, audio, scripts, or other resources at a server computer system or at other network locations, such as at additional server systems.

According to some embodiments, a network environment may be configured with a page such as a web page which is configured to launch and connect to an instance of the server program. The page may include a page file containing page code (HTML or other markup language, scripts, or code), stored or generated by the server computer system, that references resources at the server computer system or other network locations, such as additional server computer systems. The page file or related resources may include scripts or other code executable to launch and connect to an instance of the server program.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines, or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines, or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, hardware mechanism or hardware component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods, or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature, or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method comprising:
   obtaining a set of tagged pdf documents, wherein each of the tagged PDF documents includes one or more visual elements and a document object model (DOM) structure;
   pre-processing each tagged PDF document, wherein the pre-processing organizes visual elements of the document into graphical objects;
   processing each tagged PDF document, wherein the processing the tagged PDF document identifies relationships between the graphical objects and corresponding elements of the DOM structure, and generates training records corresponding to the identified relationships;
   training a machine learning model using the training records, wherein the training trains the machine learning model to determine DOM structure elements that are associated with graphical objects;
   obtaining a set of untagged PDF documents; and
   automatically tagging each of the untagged PDF documents, the tagging including
     identifying one or more graphical objects contained in the untagged PDF document,
     determining for each of the identified graphical objects a corresponding DOM structure element using the trained machine learning model, and
     generating a tagged PDF document corresponding to the untagged PDF document, wherein the tagged PDF document contains the one or more graphical objects contained in the untagged PDF document and the corresponding DOM structure elements determined by the trained machine learning model.

2. The method of claim 1, wherein the pre-processing of the tagged PDF documents includes:
   parsing the tagged PDF document to identify visual elements of the document;
   grouping the identified visual elements into visual objects;
   determining, for each of the visual objects, a corresponding visual bounding box;
   determining, for each of the visual objects, whether the visual object is a foreground element or a background element; and
   generating a cluster tree by performing a plurality of cuts which segment the PDF document into multiple visually separated pieces.

3. The method of claim 2, wherein grouping the identified visual elements into visual objects comprises grouping text elements and grouping image elements.

4. The method of claim 3, wherein the text elements comprise text characters and the text characters are grouped based on text size, font, position, and direction.

5. The method of claim 2, wherein identifying the one or more graphical objects contained in the untagged PDF document is performed in the same manner by which the one or more graphical objects contained in the tagged PDF document are identified.

6. The method of claim 2, wherein a size of the visual bounding box is different than an extent of the visual object.

7. The method of claim 2, further comprising pruning the cluster tree by recombining a plurality of leaves of the cluster tree.

8. The method of claim 2, wherein the processing of the tagged PDF documents includes:
   identifying groups of visual objects that are closely positioned visually in the PDF document;
   identifying elements of the DOM structure that correspond to the identified groups of visual objects and associating the identified elements of the DOM structure with the corresponding groups of visual objects; and
   identifying region segment features which are leaves on the cluster tree and storing indications of neighboring region segment features in the training records.

9. The method of claim 1, further comprising generating a plurality of training files, wherein each of the training files contains one or more of the generated training records, each training file corresponding to a distinct classifier of the machine learning model.

10. The method of claim 9, wherein the classifiers include: a text separator classifier; a cluster cut classifier; a cluster join classifier; a layout features classifier; a table cluster join classifier; a complex table cell classifier; and a region segment.

11. A system comprising:
a processor coupled to a memory that stores one or more instructions, the instructions executable by the processor to perform the method comprising:
obtaining a set of tagged pdf documents, wherein each of the tagged PDF documents includes one or more visual elements and a document object model (DOM) structure;
pre-processing each tagged PDF document, wherein the pre-processing organizes visual elements of the document into graphical objects;
processing each tagged PDF document, wherein the processing the tagged PDF document identifies relationships between the graphical objects and corresponding elements of the DOM structure, and generates training records corresponding to the identified relationships;
training a machine learning model using the training records, wherein the training trains the machine learning model to determine DOM structure elements that are associated with graphical objects;
obtaining a set of untagged PDF documents; and
automatically tagging each of the untagged PDF documents, the tagging including
identifying one or more graphical objects contained in the untagged PDF document,
determining for each of the identified graphical objects a corresponding DOM structure element using the trained machine learning model, and
generating a tagged PDF document corresponding to the untagged PDF document, wherein the tagged PDF document contains the one or more graphical objects contained in the untagged PDF document and the corresponding DOM structure elements determined by the trained machine learning model.

12. The system of claim 11, wherein the pre-processing of the tagged PDF documents includes:
parsing the tagged PDF document to identify visual elements of the document;
grouping the identified visual elements into visual objects;
determining, for each of the visual objects, a corresponding visual bounding box;
determining, for each of the visual objects, whether the visual object is a foreground element or a background element; and
generating a cluster tree by performing a plurality of cuts which segment the PDF document into multiple visually separated pieces.

13. The system of claim 12, wherein identifying the one or more graphical objects contained in the untagged PDF document is performed in the same manner by which the one or more graphical objects contained in the tagged PDF document are identified.

14. The system of claim 12, wherein the processing of the tagged PDF documents includes:
identifying groups of visual objects that are closely positioned visually in the PDF document;
identifying elements of the DOM structure that correspond to the identified groups of visual objects and associating the identified elements of the DOM structure with the corresponding groups of visual objects; and
identifying region segment features which are leaves on the cluster tree and storing indications of neighboring region segment features in the training records.

15. The system of claim 11, further comprising generating a plurality of training files, wherein each of the training files contains one or more of the generated training records, each training file corresponding to a distinct classifier of the machine learning model, wherein the classifiers include one or more of: a text separator classifier; a cluster cut classifier; a cluster join classifier; a layout features classifier; a table cluster join classifier; a complex table cell classifier; and a region segment.

16. A computer program product comprising a non-transitory computer-readable medium storing instructions executable by a processor to perform:
obtaining a set of tagged pdf documents, wherein each of the tagged PDF documents includes one or more visual elements and a document object model (DOM) structure;
pre-processing each tagged PDF document, wherein the pre-processing organizes visual elements of the document into graphical objects;
processing each tagged PDF document, wherein the processing the tagged PDF document identifies relationships between the graphical objects and corresponding elements of the DOM structure, and generates training records corresponding to the identified relationships;
training a machine learning model using the training records, wherein the training trains the machine learning model to determine DOM structure elements that are associated with graphical objects;
obtaining a set of untagged PDF documents; and
automatically tagging each of the untagged PDF documents, the tagging including
identifying one or more graphical objects contained in the untagged PDF document,
determining for each of the identified graphical objects a corresponding DOM structure element using the trained machine learning model, and
generating a tagged PDF document corresponding to the untagged PDF document, wherein the tagged PDF document contains the one or more graphical objects contained in the untagged PDF document and the corresponding DOM structure elements determined by the trained machine learning model.

17. The computer program product of claim 16, wherein the pre-processing of the tagged PDF documents includes:
parsing the tagged PDF document to identify visual elements of the document;
grouping the identified visual elements into visual objects;
determining, for each of the visual objects, a corresponding visual bounding box;
determining, for each of the visual objects, whether the visual object is a foreground element or a background element; and
generating a cluster tree by performing a plurality of cuts which segment the PDF document into multiple visually separated pieces.

18. The computer program product of claim 17, wherein identifying the one or more graphical objects contained in the untagged PDF document is performed in the same manner by which the one or more graphical objects contained in the tagged PDF document are identified.

19. The computer program product of claim 17, wherein the processing of the tagged PDF documents includes:

identifying groups of visual objects that are closely positioned visually in the PDF document;

identifying elements of the DOM structure that correspond to the identified groups of visual objects and associating the identified elements of the DOM structure with the corresponding groups of visual objects; and identifying region segment features which are leaves on the cluster tree and storing indications of neighboring region segment features in the training records.

20. The computer program product of claim 16, further comprising generating a plurality of training files, wherein each of the training files contains one or more of the generated training records, each training file corresponding to a distinct classifier of the machine learning model, wherein the classifiers include one or more of: a text separator classifier; a cluster cut classifier; a cluster join classifier; a layout features classifier; a table cluster join classifier; a complex table cell classifier; and a region segment.

* * * * *